Patented Aug. 18, 1931　　　　　　　　　　　　　　　　1,819,127

UNITED STATES PATENT OFFICE

ALBERT SCHMELZER, FRIEDRICH MÜTH, AND FRITZ BALLAUF, OF ELBERFELD, GERMANY, ASSIGNORS TO GENERAL ANILINE WORKS, INC., OF NEW YORK, N. Y., A CORPORATION OF DELAWARE

HYDROXY CARBOXYLIC ACIDS OF CARBAZOLE

No Drawing. Application filed January 4, 1929, Serial No. 330,430, and in Germany January 12, 1928.

The present invention relates to a process of preparing hydroxy carboxylic acids of carbazole and to new compounds obtainable thereby.

We have found that hydroxy carboxylic acids of carbazole are obtainable by causing carbon dioxide to act at an elevated temperature and under superatmospheric pressure upon an alkali compound of a hydroxy carbazole or upon a mixture of a hydroxy carbazole and a hydroxide or carbonate of an alkali metal, both methods of carrying out our process being equivalents.

The numbering of the carbazole ring system used in this specification is the following

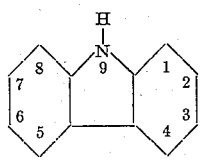

The quantities of the hydroxy carbazole and the hydroxide or carbonate of the alkali metal in the mixture to be treated with carbon dioxide may be varied within wide limits, in general we add to the hydroxy carbazole one of the mentioned alkali compounds in a quantity sufficient for producing the alkali metal salt of the hydroxy carbazole, or more.

In carrying out our invention, we cause carbon dioxide to act upon a hydroxy carbazole, for example, upon 2-hydroxy-, or 1:8-dihydroxy-carbazole under superatmospheric pressure at temperatures of from about 100° C. to about 300° C. for a prolonged time, say 6 to 8 hours or longer. The pressure and the temperature used may be varied within wide limits, whereby elevating of temperature and pressure will accelerate the reaction. We generally carry out the process at pressures from about 3 to about 50 atmospheres and at temperatures between 100 and 300° C., the most favorable reaction temperature being that temperature at which the reaction mixture begins to sinter. In order to facilitate the process, neutral substances not taking part in the reaction may be added, such as glass beads.

The process may be carried out without a solvent, for example, by grinding together a hydroxy carbazole and sodium carbonate and causing carbon dioxide to act upon the mixture under pressure, or in a solvent, for example, in water or naphthalene.

The new hydroxy carboxylic acids of carbazole are generally yellowish substances and are valuable intermediate products for the manufacture of dyestuffs and of pharmaceutical products.

The invention is illustrated by the following examples, but is not restricted thereto:

*Example 1.*—115 parts by weight of 2-hydroxy carbazole are finely ground together with 300 parts by weight of potassium bicarbonate and introduced into an autoclave with the addition of glass beads. Carbonic acid is then passed in and the mixture is maintained at a temperature of 275° C. and at 25 atmospheres pressure for 20 hours. After cooling, the reaction product is dissolved in water, filtered and the solution is acidified. The 2-hydroxy-carbazole-ortho-carboxylic acid separates in the form of a yellowish mass and is filtered, washed and dried. The crude product, melting at 266–267° C., consists of two isomeric 2-hydroxycarbazole-ortho-carboxylic acids. By re-crystallization from alcohol, the mixture can be separated. From the alcoholic solution there crystallizes a difficultly soluble acid in the form of greenish-yellow, thick prisms, which is presumed to be 2-hydroxy-carbazole-3-carboxylic acid, melting at 273–274° C. while splitting off carbon dioxide. It gives a blue ferric chloride reaction, and its alkaline solution shows a violet fluorescence. With diazocompounds it couples to form azodyestuffs. In sulfuric acid solution it does not form an indophenol with para-nitroso-phenol. In concentrated sulfuric acid it is soluble with a yellow coloration. By acetylating, the corresponding acetyl derivative is obtained which crystallizes from glacial acetic acid in the form of needles of the melting point of 227° C. The ortho-anisidide, prepared according to usual methods, crystallizes from benzene or methyl alcohol in the form of long prisms of the melting point 204–206° C.

When concentrating the alcoholic mother liquor the isomeric acid crystallizes which is presumed to be the 2-hydroxycarbazole-1-carboxylic acid. After re-crystallization from xylene, it melts at 271–272° C. The pale yellowish colored acid gives the blue ferric chloride reaction; in general, its properties are similar to those of the isomeric acid. The ortho-anisidide crystallizes from xylene and has the melting point of 192–193° C.

*Example 2.*—75 parts by weight of 2-hydroxy carbazole are introduced into an aqueous solution of 150 parts by weight of potassium bicarbonate in 500 parts by weight of water and heated in an autoclave under a carbondioxide pressure of 40 atmospheres to an inner temperature of 210° C. for about 8 hours. The reaction mixture is worked up as described in Example 1. The same two isomeric acids, as disclosed in Example 1, are obtained.

*Example 3.*—A mixture of 75 parts by weight of 2-hydroxy carbazole, 250 parts by weight of potassium bicarbonate and 400 parts by weight of glass beads, said mixture being kept in an autoclave, is dried for 14 hours at 160–170° C. Then the autoclave is closed and carbon dioxide is forced in, and the reaction mixture is kept for about 9–10 hours at a temperature of 180–200° C. and under a carbon dioxide pressure of 40 atmospheres. The mixture is worked up as described in Example 1. Only the 2-hydroxy carbazole-3-carboxylic acid of the melting point of 273–274° C. is obtained.

*Example 4.*—100 parts by weight of the sodium salt of 2-hydroxy carbazole are mixed with glass beads and introduced into an autoclave. Then carbon dioxide is forced in, and the mass is kept for 24 hours at about 210–220° C. under a carbondioxide pressure of 40 atmospheres. Then the mass is worked up as described in Example 1, and the same two isomeric acids, as disclosed in Example 1, are obtained.

*Example 5.*—100 parts by weight of 1-hydroxy carbazole are mixed with 310 parts by weight of potassium bicarbonate and 500 parts by weight of glass beads and introduced into an autoclave. Then carbondioxide is forced in and the mass is kept for 24 hours at a temperature of 170–180° C. under a carbondioxide pressure of 25 atmospheres. The reaction mass is boiled with 1200 parts by weight of water. The blue fluorescent solution is acidified and the precipitated 1-hydroxy-carbazole-2-carboxylic acid is filtered, washed and dried. After re-crystallization from alcohol, yellowish colored needles are obtained which melt at 224–225° C. while splitting off carbondioxide. The alcoholic solution gives the greenish blue ferric chloride reaction and does not form an indophenol with p-nitrosophenol.

*Example 6.*—60 parts by weight of 1:8-dihydroxycarbazole (obtainable according to our application Ser. No. 274,354, filed May 1st, 1928) are finely ground together with 300 parts by weight of potassium bicarbonate and mixed with 400 parts by weight of glass beads, introduced into an autoclave and kept for about 20 hours at a temperature of 190–200° C. under a carbondioxide pressure of 40 atmospheres. The reaction mass is dissolved in hot water, filtered and acidified with diluted hydrochloric acid. The new 1:8-dihydroxy carbazole-o-o′-dicarboxylic acid is very easily soluble in water; it is extracted with ether from its aqueous solution, and is obtained in the form of a greenish-yellow powder. It is scarcely soluble in alcohol, and it melts above 305° C. while splitting off carbondioxide. In concentrated sulfuric acid it is soluble with a yellowish coloration; it does not form an indophenol with para-nitrosophenol in sulfuric acid solution, and gives a bluish-green coloration with ferric chloride.

Under the term a "hydroxycarbazole" we understand mono- and dihydroxycarbazoles.

We claim:

1. In the process of preparing hydroxy carbazole carboxylic acids the step which comprises reacting with carbondioxide under superatmospheric pressure upon a mixture of a hydroxycarbazole and a compound of the group consisting of the hydroxides and carbonates of the alkali metals at a temperature from about 100° to about 300° C.

2. In the process of preparing hydroxy carbazole carboxylic acids the step which comprises reacting with carbondioxide under a pressure from about 3 to about 50 atmospheres upon a mixture of a hydroxycarbazole and a compound of the group consisting of the hydroxides and carbonates of the alkali metals at a temperature from about 100° to about 300° C.

3. In the process of preparing hydroxy carbazole carboxylic acids the step which comprises reacting with carbondioxide under superatmospheric pressure upon a hydroxycarbazole mixed with an at least equivalent quantity of a compound of the group consisting of the hydroxides and carbonates of the alkali metals at a temperature from about 100° to about 300° C.

4. In the process of preparing hydroxy carbazole carboxylic acids the step which comprises reacting with carbondioxide under a pressure from about 3 to about 50 atmospheres upon a hydroxycarbazole mixed with at least an equivalent quantity of a compound of the group consisting of the hydroxides and carbonates of the alkali metals at a temperature from about 100° to about 300° C.

5. In the process of preparing hydroxy carbazole carboxylic acids the step which comprises reacting with carbondioxide under superatmospheric pressure upon a mixture of a hydroxycarbazole and a compound of the group consisting of the hydroxides and carbonates of the alkali metals at a temperature from about 100° to about 300° C. for at least 6 hours.

6. In the process of preparing hydroxy carbazole carboxylic acids the step which comprises reacting with carbondioxide under a pressure from about 3 to about 50 atmospheres upon a mixture of a hydroxycarbazole and a compound of the group consisting of the hydroxides and carbonates of the alkali metals at a temperature from about 100° to about 300° C. for at least 6 hours.

7. In the process of preparing hydroxycarbazole carboxylic acids the step which comprises reacting with carbondioxide under superatmospheric pressure upon a hydroxycarbazole mixed with at least an equivalent quantity of a compound of the group consisting of the hydroxides and carbonates of the alkali metals at a temperature from about 100° to about 300° C. for at least 6 hours.

8. In the process of preparing hydroxcarbazole carboxylic acids the step which comprises reacting with carbondioxide under a pressure from about 3 to about 50 atmospheres upon a hydroxycarbazole mixed with at least an equivalent quantity of a compound of the group consisting of the hydroxides and carbonates of the alkali metals at a temperature from about 100° to about 300° C. for at least 6 hours.

9. In the process of preparing hydroxycarbazole carboxylic acids the step which comprises reacting with carbondioxide under a pressure from about 3 to about 50 atmospheres upon a hydroxycarbazole, intimately mixed with at least an equivalent quantity of a compound of the group consisting of the potassium hydroxides and carbonates at a temperature from about 100° to about 300° C. for at least 6 hours.

10. The process which comprises reacting with carbon dioxide under a pressure of about 25 atmospheres upon a mixture of 115 parts by weight of 2-hydroxycarbazole and 350 parts by weight of sodium-bicarbonate at a temperature of about 275° C. for about 20 hours, dissolving the reaction mass, in hot water, filtering acidifying the filtrate with hydrochloric acid, filtering the precipitate and recrystallizing it from alcohol.

11. As new products compounds of the group consisting of mono hydroxy-carbazole mono-carboxylic acids and dihydroxy-carbazole-dicarboxylic acids containing the carboxylic acid groups in the benzene nuclei, being generally pale yellowish powders, and being valuable intermediate products in the manufacture of dyestuffs and of pharmaceutical substances.

12. As new products monohydroxy-carbazole-mono-carboxylic acids containing the carboxylic acid groups in the benzene nuclei, being generally pale yellowish powders, and being valuable intermediate products in the manufacture of dyestuffs and of pharmaceutical substances.

13. As new products 2-hydroxy-carbazole-mono-carboxylic acids containing the carboxylic acid groups in the benzene nuclei, being generally pale yellowish powders, and being valuable intermediate products in the manufacture of dyestuffs and of pharmaceutical substances.

14. As a new product 2-hydroxy-carbazole-3-carboxylic acid, crystallizing from alcohol in the form of greenish-yellow, thick prisms, melting at 273°–274° C., while splitting off carbondioxide, giving a blue ferric chloride reaction, its alkaline solution showing violet fluorescence, and being a valuable intermediate product in the manufacture of dyestuffs and of pharmaceutical substances.

In testimony whereof we have hereunto set our hands.

ALBERT SCHMELZER. [L. S.]
FRIEDRICH MÜTH. [L. S.]
FRITZ BALLAUF. [L. S.]